United States Patent
Rick et al.

(10) Patent No.: US 7,257,760 B2
(45) Date of Patent: Aug. 14, 2007

(54) EARLY DECODING OF A CONTROL CHANNEL IN A WIRELESS COMMUNICATION SYSTEM

(76) Inventors: Roland Reinhard Rick, 11456 Northwick Way, San Diego, CA (US) 92131; James Christopher Weaver, 1213 Avocet Ct., Cardiff by the Sea, CA (US) 92007

( * ) Notice: Subject to any disclaimer, the term of this patent is extended or adjusted under 35 U.S.C. 154(b) by 455 days.

(21) Appl. No.: 10/723,139

(22) Filed: Nov. 25, 2003

(65) Prior Publication Data

US 2005/0113087 A1    May 26, 2005

(51) Int. Cl.
*H03M 13/39* (2006.01)
*H03M 13/05* (2006.01)
*H04Q 7/32* (2006.01)

(52) U.S. Cl. .................. 714/760; 714/776; 714/790
(58) Field of Classification Search ............... 714/760, 714/776, 790
See application file for complete search history.

(56) References Cited

U.S. PATENT DOCUMENTS 5,406,613 A  4/1995  Peponides et al. ............ 379/58

5,818,829 A * 10/1998  Raith et al. .................. 370/347

FOREIGN PATENT DOCUMENTS

| DE | 19813507 | 9/1999 |
|----|----------|--------|
| EP | 0673175 | 3/1995 |
| EP | 1313245 | 6/2002 |

* cited by examiner

*Primary Examiner*—R. Stephen Dildine
(74) *Attorney, Agent, or Firm*—Thomas Rouse; Thien Nguyen; Peng Zhu

(57) ABSTRACT

Techniques are provided for performing early decoding of a message on a control channel in a wireless (e.g., GSM) communication system. In a GSM system, a message for a paging channel is transmitted in four bursts. For early decoding in GSM, a terminal initially receives the first two bursts for the message. The two bursts are processed and decoded to recover the message, which is then checked to determine whether it has been decoded correctly or in error. The decoding process can terminate and the terminal may go to sleep early if the recovered message is good. Otherwise, the third burst is received, and all three bursts are processed and decoded to recover the message. Again, the decoding process can terminate if the recovered message is good. Otherwise, the fourth burst is received, and all four bursts are processed and decoded to recover the message.

17 Claims, 9 Drawing Sheets

Early Decoding After Receiving Two Bursts

Early Decoding After Receiving Three Bursts

EARLY DECODING OF A CONTROL CHANNEL IN A WIRELESS COMMUNICATION SYSTEM

BACKGROUND

I. Field

The present invention relates generally to communication, and more specifically to techniques for decoding a control channel in a wireless communication system.

II. Background

A terminal in a wireless communication system (e.g., a cellular system) is typically designed to operate in one of several modes, such as active and idle, at any given moment. In the active mode, the terminal can actively exchange data with one or more base stations in the system (e.g., for a voice or data call). In the idle mode, which is also referred to as standby mode, the terminal typically monitors a paging channel for messages alerting the terminal to the presence of an incoming call. The terminal may also monitor a broadcast control channel for messages to update its system parameters.

In the idle mode, the terminal continues to consume power in order to sustain circuitry needed to monitor signals transmitted from base stations in the system. The terminal (e.g., a cellular phone) may be portable and powered by an internal battery. Power consumption by the terminal in the idle mode decreases the available battery power, which then shortens "standby" time between battery recharges and "talk" time when a call is placed or received. Therefore, it is highly desirable to minimize the terminal's power consumption while in the idle mode in order to prolong battery life.

In one technique for reducing power consumption in the idle mode, messages (if any) are sent on the paging channel to the terminal at designated times. For example, in a Global System for Mobile Communications (GSM) system, each terminal is assigned specific Time Division Multiple Access (TDMA) frames for its paging channel, and messages are sent to the terminal in these TDMA frames. In GSM, a paging message (i.e., a message to be sent on the paging channel) is first encoded into a coded data block. The bits within the coded data block are then interleaved (i.e., reordered) and partitioned into four "output blocks". The four output blocks are then transmitted on the paging channel as four "bursts" in four consecutive TDMA frames.

In a GSM system, a terminal can periodically rather than continuously monitor the paging channel for messages from the base stations. Conventionally, the terminal wakes up from a "sleep" state prior to the first designated TDMA frame for the paging channel, enters an "awake" state and receives all four bursts sent for a paging message, and processes (i.e., concatenates, deinterleaves, and decodes) these four bursts to recover the paging message. (The sleep and awake states are also referred to as "inactive" and "active" states, respectively.) The terminal would then revert back to the sleep state if additional communication is not required and would remain in the awake state if the recovered paging message indicates that additional actions need to be performed. In the time period between successive presences in the awake state, the terminal is in the sleep state and powers down as much circuitry as possible in order to conserve power.

A key benchmark for commercial cellular phones is standby time. Standby time is a function of (1) the amount of time spent in the awake state, (2) the amount of current spent while in the awake state, and (3) the amount of current spent while in the sleep state. The amounts of current spent in the sleep and awake states are determined by the specific design of the phone. However, for any given phone design, longer standby time may be achieved by reducing the amount of time spent in the awake state.

There is therefore a need in the art for techniques to shorten the amount of time needed to receive messages on the paging channel so that standby time can be improved.

SUMMARY

Techniques are provided herein for performing early decoding of a message on a control channel in a wireless communication system. These techniques may be used for a common control channel (CCCH), a paging channel (PCH), and a broadcast control channel (BCCH) in a GSM system and may also be used for control channels in other systems. Early decoding may be performed if (1) a message is encoded and partitioned into multiple data blocks, which are transmitted at different times, and (2) the encoding and interleaving schemes used for the message place sufficient information to recover the complete message in a subset of the data blocks. For example, a paging message in GSM is encoded and partitioned into four output blocks that are transmitted as four bursts, and the message may be recovered with as few as two bursts under good channel conditions.

For early decoding in GSM, a terminal initially receives the first two bursts for a paging message. The two received bursts are processed and decoded to recover the message. The recovered message is then checked based on an error detection value included in the message to determine whether the message has been decoded correctly (i.e., "good") or in error (i.e., "erased"). If the recovered message is good, then the decoding process can terminate. The terminal may then go to sleep early, which saves battery power and extends standby time. Otherwise, if the recovered message is not decoded correctly, then the third burst for the message is received, and all three bursts are processed and decoded to recover the message. Again, the decoding process can terminate and the terminal may go to sleep early if the recovered message is good. Otherwise, the fourth and final burst for the message is received, and all four bursts are processed and decoded to recover the message.

In general, a sufficient number of bursts (or data blocks) are initially received, processed, and decoded to recover a message on a control channel. If the message is decoded in error, then the next data block is received and all of the received data blocks are decoded to recover the message. The reception of one additional data block and the decoding of all received data blocks are repeated until the message is decoded correctly or all of the data blocks for the message have been received and decoded.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1A:
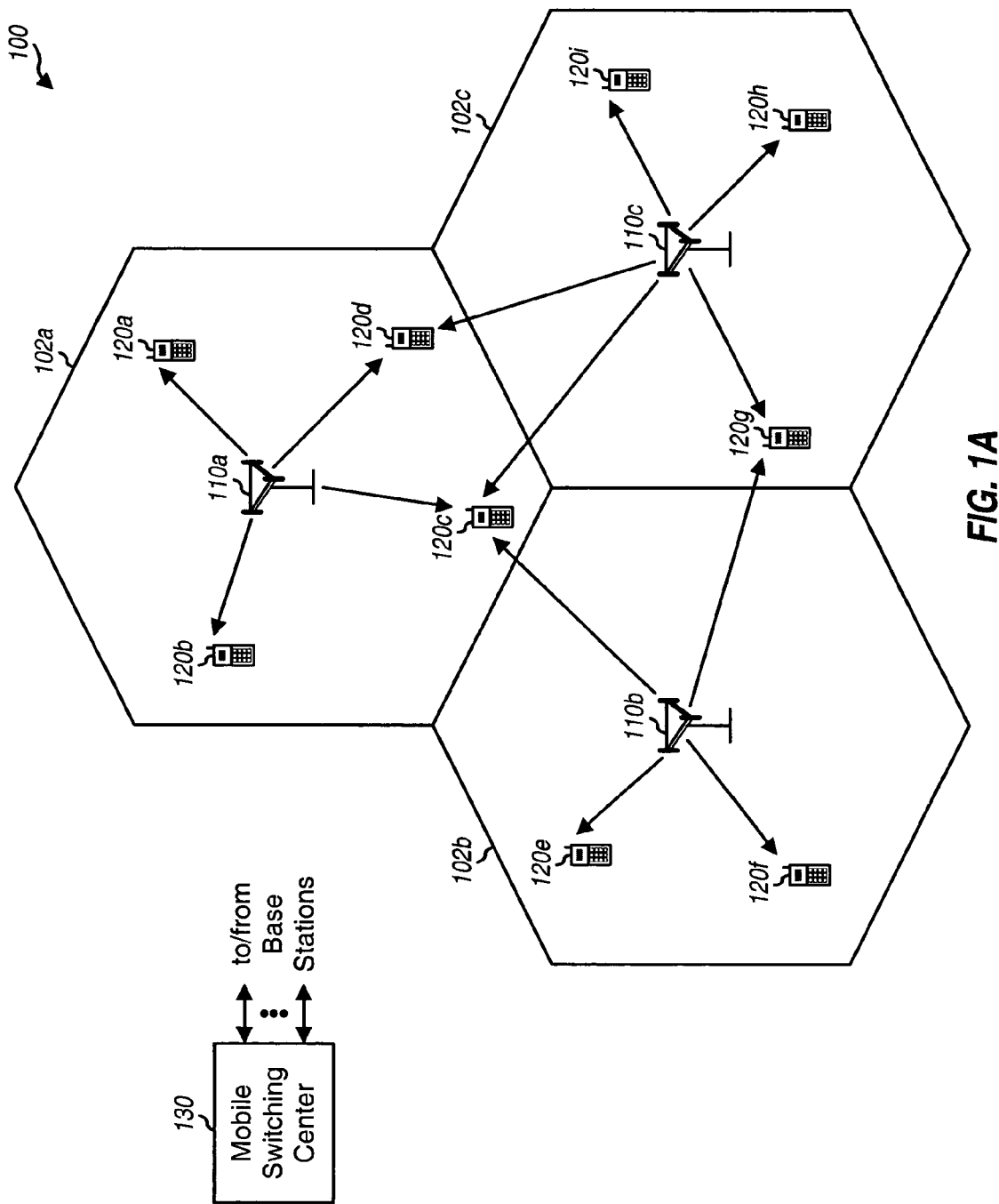
FIG. 1A shows a wireless communication system.

FIG. 1A shows a wireless communication system 100 with a number of base stations 110 that provide communication for a number of terminals 120. A base station is a fixed station and may also be referred to as a base transceiver subsystem (BTS), a Node B, an access point, or some other terminology. Terminals 120 are typically dispersed throughout the system. A terminal may be fixed or mobile and may also be referred to as a mobile station, a user equipment (UE), a wireless communication device, or some other terminology. A mobile switching center (MSC) 130 couples to base stations 110, provides coordination and control for the base stations, and further controls the routing of data to/from the terminals served by these base stations. An MSC may also be referred to as a radio network controller (RNC) or some other terminology.

System 100 may be a TDMA system that may implement one or more TDMA standards such as GSM. System 100 may also be a Code Division Multiple Access (CDMA) system that may implement one or more CDMA standards such as Wideband CDMA (W-CDMA), IS-2000, IS-856, IS-95, and so on. These standards are well known in the art.

The techniques described herein for performing early decoding of a control channel may be used for various wireless communication systems. Moreover, these techniques may be used for various control channels, such as the broadcast control channel and the paging channel in GSM. For clarity, these techniques are specifically described below for the paging channel in a GSM system.

Figure 1B:
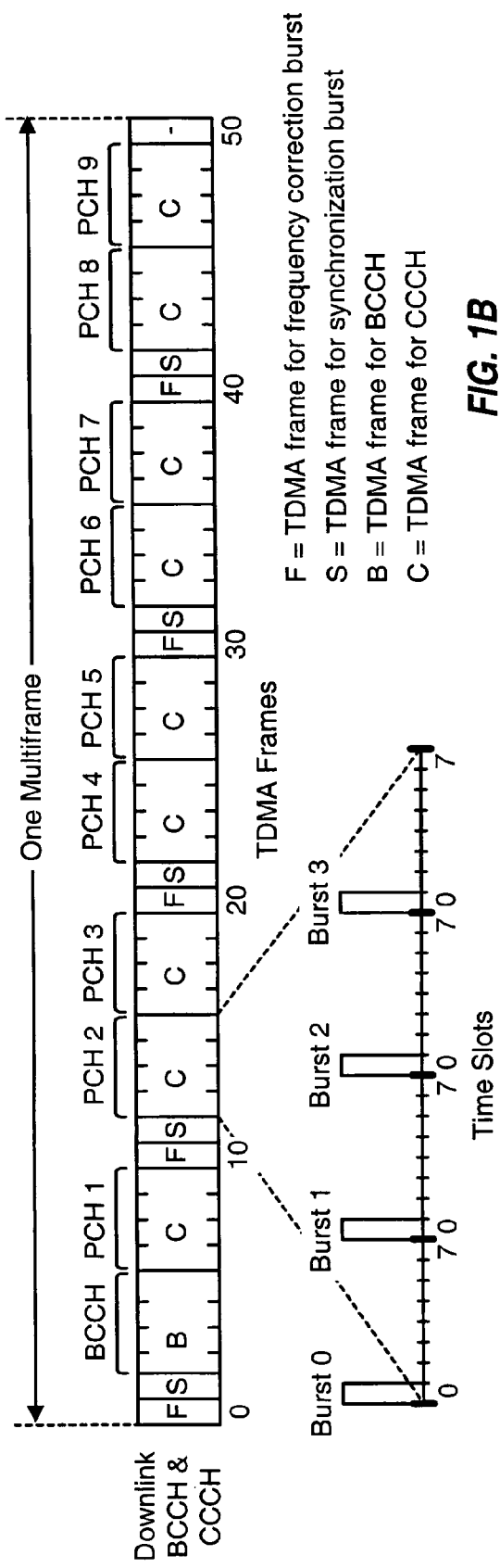
FIG. 1B shows the channel organization for the BCCH and CCCH in GSM.

FIG. 1B shows an exemplary channel organization for the broadcast control channel (BCCH) and the common control channel (CCCH) in GSM. The timeline for downlink transmission is divided into multiframes. For the control channels, each multiframe is partitioned into 51 TDMA frames, which are labeled as TDMA frames 0 through 50. The BCCH is sent in TDMA frames 2, 3, 4, and 5 of each multiframe. The CCCH may be viewed as including nine paging channels PCH 1 through PCH 9, as shown in FIG. 1B. Each paging channel serves a respective group of terminals. Each terminal is assigned to one of the paging channels on every N-th occurrence of the 51-multiframe structure where N ranges from 2 to 9. Paging messages (if any) for each terminal are sent on the assigned paging channel.

In GSM, each TDMA frame is further partitioned into 8 time slots, which are labeled as time slots 0 through 7. Time slot 0 is used for the control channels and the other seven times slots 1 through 7 are used for traffic channels. A message for the BCCH is transmitted in time slot 0 of TDMA frames 2, 3, 4, and 5. A message for the first paging channel, PCH 1, is transmitted in time slot 0 of TDMA frames 6, 7, 8, and 9. Messages for the other paging channels are transmitted in time slot 0 of their associated TDMA frames, as shown in FIG. 1B. The transmission in each time slot is referred to as a "burst" in GSM.

Other control channel organizations may also be used to carry the BCCH and CCCH. The channel organizations for the BCCH and CCCH are described in detail in 3GPP TS 05.01, which is publicly available.

Figure 2:
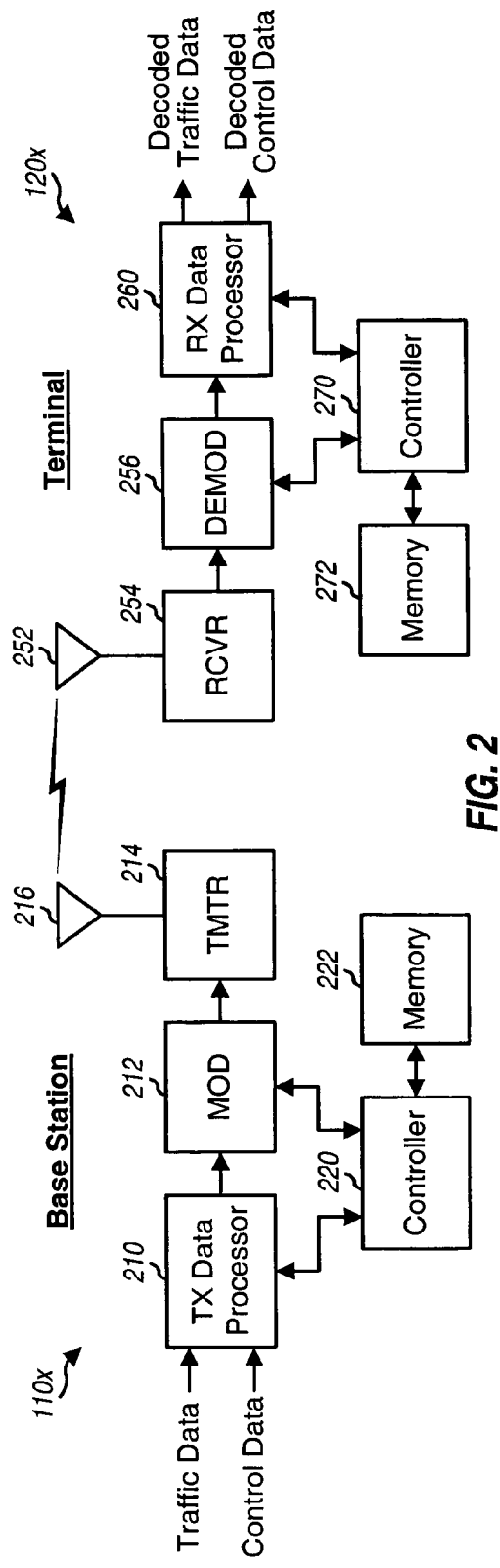
FIG. 2 shows a block diagram of a base station and a terminal.

FIG. 2 shows a block diagram of a base station 110x and a terminal 120x. Base station 110x is one of the base stations in FIG. 1A, and terminal 120x is one of the terminals in FIG. 1A. On the downlink, at base station 110x, a TX data processor 210 receives traffic data for traffic channels and control data for control channels. TX data processor 210 formats, codes, and interleaves the data for each traffic/control channel based on the coding and interleaving schemes specified for that channel and provides output data for the traffic/control channel. A modulator (MOD) 212 then receives and processes the output data for all traffic and control channels, as specified by GSM, and provides modulated data. A transmitter unit (TMTR) 214 processes the modulated data to generate a downlink signal, which is then transmitted via an antenna 216 to the terminals.

At terminal 120x, the downlink signal transmitted by base station 110x is received by an antenna 252 and provided to a receiver unit (RCVR) 254. Terminal 120x may receive and process multiple downlink signals from multiple base stations. For simplicity, the processing for only one downlink signal from base station 110x is described below. Receiver unit 254 conditions and digitizes the received signal from antenna 252 and provides a stream of data samples. A demodulator (DEMOD) 256 then processes the data samples and provides demodulated data. An RX data processor 260 next deinterleaves and decodes the demodulated data to recover the traffic and control data transmitted by base station 110x. The processing by demodulator 256 and RX data processor 260 is complementary to that performed by modulator 212 and TX data processor 210, respectively, at base station 110x.

Controllers 220 and 270 direct the operation at base station 10x and terminal 120x, respectively. Memory units 222 and 272 provide storage for program codes and data used by controllers 220 and 270, respectively. For simplicity, FIG. 2 only shows the processing units for downlink transmission and does not show all of the processing units normally present at base station 10x and terminal 120x.

Figure 3:
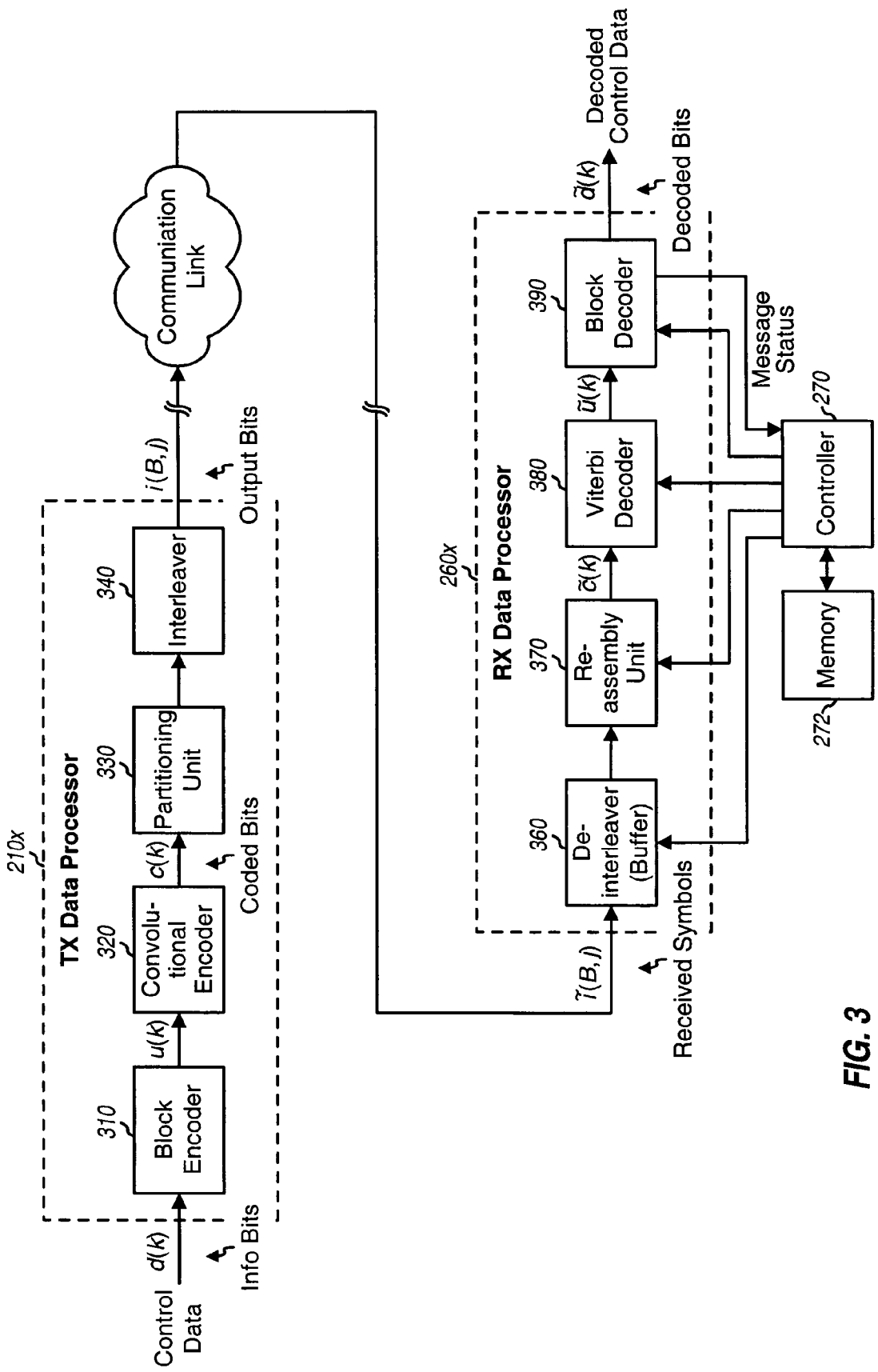
FIG. 3 shows a block diagram of a transmit (TX) data processor at the base station and a receive (RX) data processor at the terminal.

FIG. 3 shows a block diagram of a TX data processor 210x and an RX data processor 260x. TX data processor 210x is an embodiment of TX data processor 210 in FIG. 2 and performs the transmitter processing for a paging channel. RX data processor 260x is an embodiment of RX data processor 260 in FIG. 2 and performs the receiver processing for the paging channel. In GSM, each message to be sent on the paging channel or the broadcast control channel is provided as a block of 184 information bits by higher layer. The processing at base station 10x and terminal 120x is thus performed on each block of information bits.

Within TX data processor 210x, a block encoder 310 performs block encoding on a block of information bits for a paging message (i.e., a message to be sent on the paging channel). A convolutional encoder 320 then performs convolutional encoding on the output from block encoder 310 and provides a block of coded data. A partitioning unit 330 next partitions the coded data block into four smaller blocks. An interleaver 340 then reorders the coded bits in each of the four smaller blocks and provides four output blocks, which are subsequently transmitted in four TDMA frames designated for the paging channel. For simplicity, the processing by other units between TX data processor 210x and RX data processor 260x is not shown in FIG. 3.

The partitioning and interleaving may be performed in various manners. For example, the coded data may be partitioned first and then interleaved, as shown in FIG. 3. Alternatively, the coded data may be interleaved first and then partitioned into smaller blocks. The partitioning and interleaving may also be performed in one operation. In any case, neighboring bits out of the decoder are spread across all of the smaller blocks. For clarity, the coded data is described as being partitioned first and then interleaved, as permitted by GSM.

Within RX data processor 260x, a deinterleaver 360 receives and deinterleaves "received symbols" for each output block. Each received symbol is a soft-decision symbol that is a noisy estimate of a hard-decision coded bit transmitted by base station 110x. A soft-decision symbol is a multi-bit value, and a hard-decision bit is a 1-bit value of "0" or "1". Deinterleaver 360 also acts as a buffer to store/buffer the received symbols. A reassembly unit 370 then reassembles or concatenates the deinterleaved symbols for all output blocks that have been received by terminal 120x for the paging message being recovered. A Viterbi decoder 380 then performs convolutional decoding on the reassembled symbols from reassembly unit 370 and provides convolutionally decoded bits. A block decoder 390 next performs block decoding on the convolutionally decoded bits and provides a recovered paging message. Block decoder 390 also provides the status of the recovered paging message. The message status is "good" if the paging message is decoded correctly and "bad" or "erased" if the paging message is decoded in error.

Figure 4:
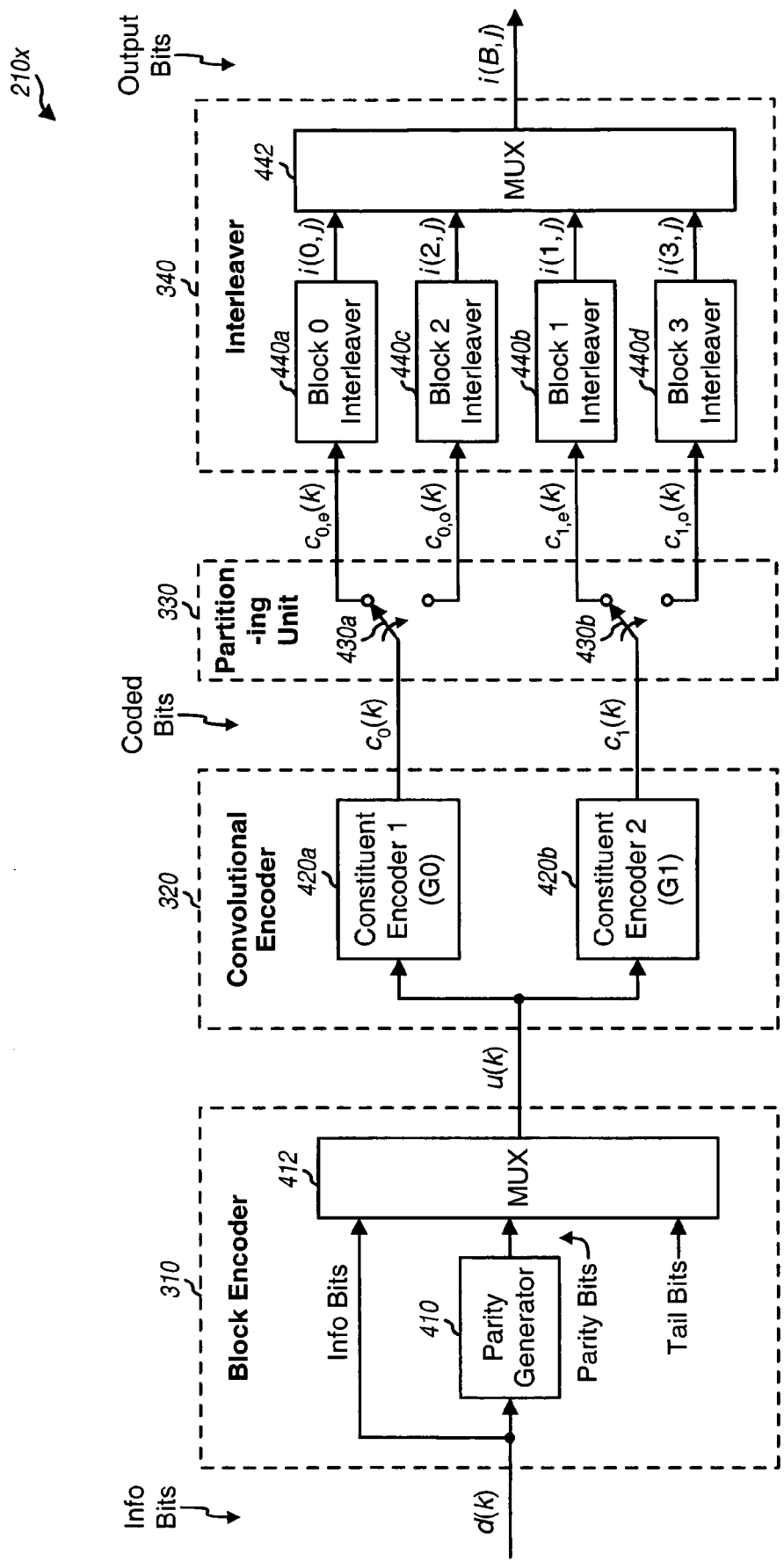
FIG. 4 shows a block diagram of the units within the TX data processor.

FIG. 4 shows a block diagram of the units within TX data processor 210x. The processing for a block of 184 information bits for one paging message is described below.

Within block encoder 310, the 184 information bits d(k) for the paging message are provided to a parity generator 410 and a multiplexer 412. Parity generator 410 implements the following generator polynomial:

$$g(D)=(D^{23}+1)\cdot(D^{17}+D^3+1), \qquad \text{Eq (1)}$$

where D denotes a delay of one bit period. The generator polynomial in equation (1) is a shortened binary cyclic code that is also referred to as a "FIRE" code. Parity generator 410 generates 40 parity bits based on the 184 information bits for the paging message.

Multiplexer 412 receives the 184 information bits, the 40 parity bits from parity generator 410, and tail bits having values of zero. Multiplexer provides the 184 information bits, followed by the 40 parity bits, and finally followed by 4 tail bits (i.e., 228 bits in all). The block coding is performed in a systematic manner whereby the information bits are identifiable (i.e., not altered) in the output from the block encoder.

Within convolutional encoder 320, the 228 bits u(k) from block encoder 310 are provided to two constituent encoders 420a and 420b, which collectively implement a rate ½, constraint length 5, convolutional encoder. Constituent encoders 420a and 420b implement the following generator polynomials:

$$G0=1+D^3+D^4 \text{ and}$$

$$G1=1+D+D^3+D^4 \qquad \text{Eq (2)}$$

where G0 and G1 are the generator polynomials for constituent encoders 420a and 420b, respectively. First constituent encoder 420a encodes the 228 bits u(k) and provides 228 coded bits $c_0(k)$. Similarly, second constituent encoder 420b encodes the same 228 bits u(k) and provides 228 coded bits $c_1(k)$. The coded bits $c_0(k)$ and $c_1(k)$ are generated as follows:

$$c_0(k)=u(k)+u(k-3)+u(k-4), \text{ and}$$

$$c_1(k)=u(k)+u(k-1)+u(k-3)+u(k-4), \text{ for } k=0\ldots 227. \qquad \text{Eq (3)}$$

Convolutional encoder 320 provides a total of 456 coded bits, c(k) for k=0 . . . 455, for the paging message. These 456 coded bits are defined as follows:

$$c(2k)=c_0(k), \text{ and}$$

$$c(2k+1)=c_1(k), \text{ for } k=0\ldots 227. \qquad \text{Eq (4)}$$

The coded bits from constituent encoders 420a and 420b are thus multiplexed such that the even-indexed coded bits c(2k) from convolutional encoder 320 are provided by constituent encoder 420a and the odd-indexed coded bits c(2k+1) from convolutional encoder 320 are provided by constituent encoder 420b.

Partitioning unit 330 includes two switches 430a and 430b. Interleaver 340 includes four block interleavers 440a through 440d and a multiplexer 442. Within partitioning unit 330, switch 430a provides (1) the even-indexed coded bits from first constituent encoder 420a, which are denoted as $c_{0,e}(k)$ or $c_0(2k)$ for k=0 . . . 113, to block 0 interleaver 440a and (2) the odd-indexed coded bits from first constituent encoder 420a, which are denoted as $c_{0,o}(k)$ or $c_0(2k+1)$, to block 2 interleaver 440c. Similarly, switch 430b provides (1) the even-indexed coded bits from second constituent encoder 420b, which are denoted as $C_{1,e}(k)$ or $c_1(2k)$, to block 1 interleaver 440b and (2) the odd-indexed coded bits from second constituent encoder 420b, which are denoted as $c_{1,o}(k)$ or $c_1(2k+1)$, to block 3 interleaver 440d.

The four block interleavers 440a through 440d provide four output blocks that are transmitted as four bursts for the paging message. Each of the four block interleavers 440a through 440d reorders its 114 coded bits in accordance with the interleaving scheme defined by GSM. The interleaving may be expressed as:

$$i(B,j)=c(k) \text{ for} \qquad \text{Eq (5 a)}$$

$$k=0\ldots 455,$$

$$B=(k \bmod 4), \text{ and} \qquad \text{Eq (5b)}$$

$$j=2\cdot((49k) \bmod 57)+((k \bmod 8) \text{ div } 4). \qquad \text{Eq (5c)}$$

In equation set (5), k is the index for the 456 coded bits c(k) from convolutional encoder 320, B is an index for the four output blocks (and also the four bursts) for the paging message, and j is an index for the bits within each block interleaver. Equation (5b) indicates that the block of coded bits, c(k) for k=0 . . . 455, for the paging message is partitioned into four output blocks. The reordering of the coded bits within each output block is determined by equation (5c). In particular, for each coded bit with an index of k, the output block for this coded bit is determined by equation (5b) and its location within the output block is determined by equation (5c).

Multiplexer 442 couples to all four block interleavers 440*a* through 440*d*. Multiplexer 442 provides the 114 interleaved bits from block 0 interleaver 440*a* as the first output block, then the 114 interleaved bits from block 1 interleaver 440*b* as the second output block, then the 114 interleaved bits from block 2 interleaver 440*c* as the third output block, and finally the 114 interleaved bits from block 3 interleaver 440*d* as the fourth output block.

The block encoding, convolutional encoding, partitioning, and interleaving for the paging channel are described in detail in 3GPP TS 05.03, which is publicly available. The specific interleaving scheme used by GSM and shown in equation set (5) allows the partitioning and interleaving to be depicted as shown in FIG. 4, which clearly shows the mapping of coded bits to blocks. For other interleaving schemes, the mapping of coded bits to blocks may not be straightforward. Thus, the more general representation would be: encoding, then interleaving, then partitioning.

Figure 5:
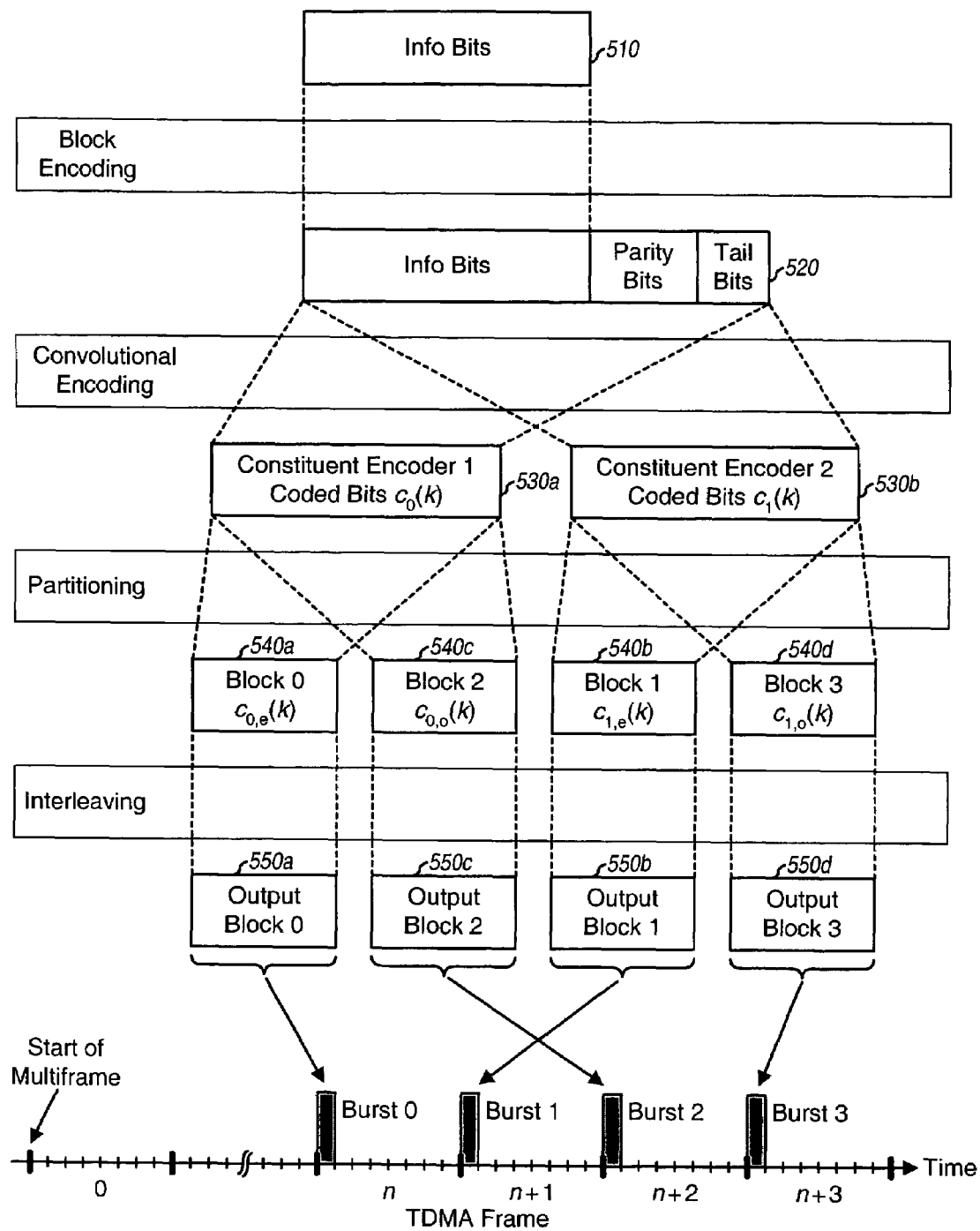
FIG. 5 illustrates the processing and transmission of a paging message in GSM.

FIG. 5 illustrates the processing and transmission of a paging message in GSM. Block encoder 310 processes a block 510 of 184 information bits for the paging message and provides a block 520 containing 184 information bits, 40 parity bits, and 4 tail bits. Convolutional encoder 320 then processes block 520 and provides two blocks 530*a* and 530*b* of coded data. Block 530*a* contains 228 coded bits that are generated by first constituent encoder 420*a*, and block 530*b* contains 228 coded bits that are generated by second constituent encoder 420*b*. Partitioning unit 330 then partitions block 530*a* into two smaller blocks 540*a* and 540*c*. Block 540*a* includes the even-indexed coded bits $c_{0,e}(k)$ in block 530*a*, and block 540*c* includes the odd-indexed coded bits $c_{0,o}(k)$ in block 530*a*. Similarly, partitioning unit 330 partitions block 530*b* into two smaller blocks 540*b* and 540*d*. Block 540*b* includes the even-indexed coded bits $c_{1,e}(k)$ in block 530*b*, and block 540*d* includes the odd-indexed coded bits $c_{1,o}(k)$ in block 530*b*. Interleaver 340 interleaves the coded bits in each of blocks 540*a* through 540*d* and provides four corresponding output blocks 550*a* through 550*d*, respectively.

As shown in FIG. 5, first output block 550*a* is transmitted in time slot 0 of TDMA frame n and is denoted as burst 0, second output block 550*b* is transmitted in time slot 0 of TDMA frame n+1 and is denoted as burst 1, third output block 550*c* is transmitted in time slot 0 of TDMA frame n+2 and is denoted as burst 2, and fourth output block 550*d* is transmitted in time slot 0 of TDMA frame n+3 and is denoted as burst 3. Here, n is the first TDMA frame for the paging message.

As shown in FIGS. 4 and 5, the paging message is encoded, interleaved, and transmitted in four bursts in GSM. Based on the structure of the convolutional code and the interleaving scheme, the paging message may be recovered by a terminal under good signal conditions with fewer than all four bursts. The bits in the missing (i.e., not yet received) bursts may be treated as if they have been punctured (i.e., deleted) by base station 110*x*. Erasures are then substituted for these missing bits for the convolutional decoding process. An erasure is a specific value that is recognized by Viterbi decoder 380 as being for a missing (e.g., punctured) coded bit and is given no weight in the convolutional decoding process.

Figure 6:
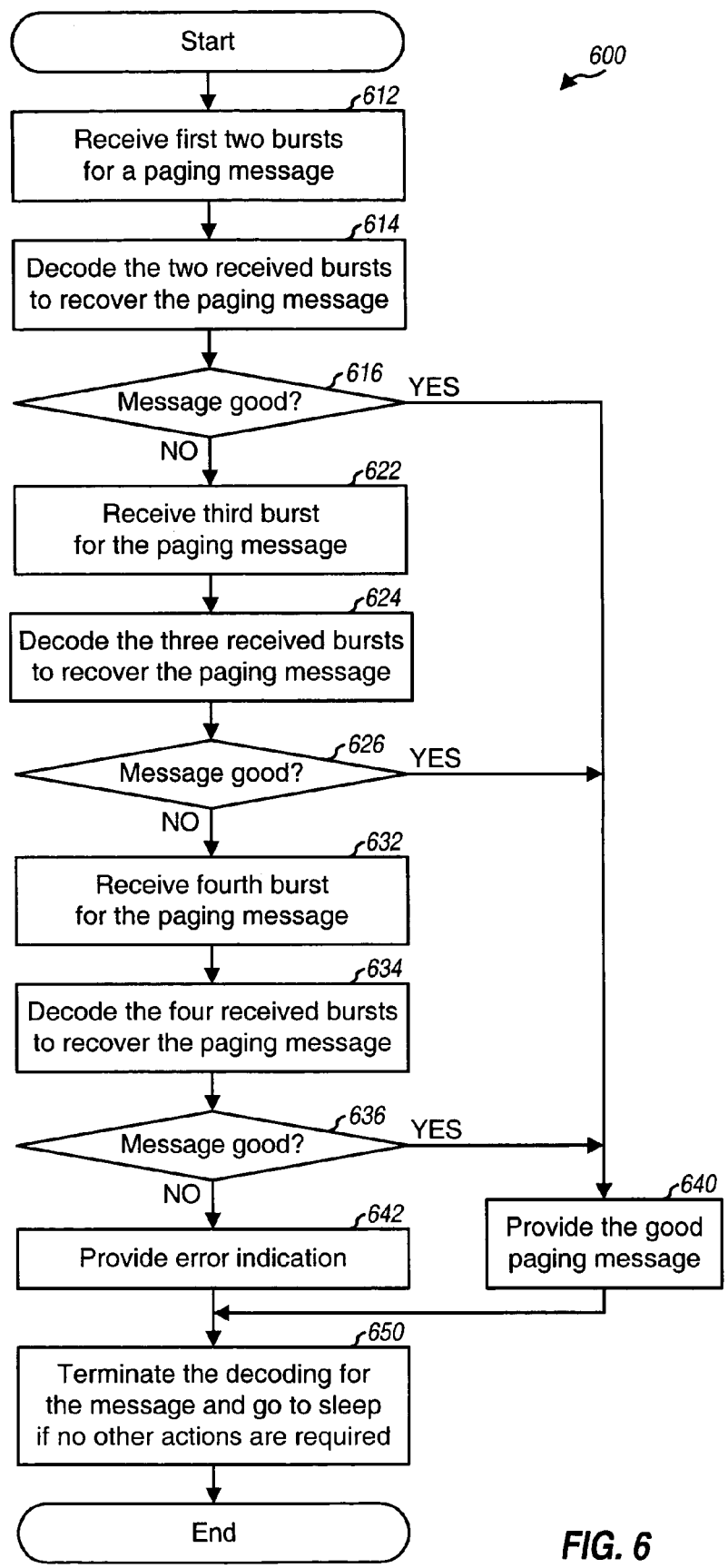
FIG. 6 shows a process for performing early decoding to recover a paging message in GSM.

FIG. 6 shows a flow diagram of a process 600 for performing early decoding to recover a paging message in GSM. Initially, the first two bursts (i.e., bursts 0 and 1 in FIG. 5) for the paging message are received by the terminal (step 612). The two received bursts are then decoded to recover the paging message (step 614). For early decoding with only the first two bursts, erasures are substituted for the missing bits in the last two bursts (i.e., bursts 2 and 3 in FIG. 5). The resulting code with only the first two bursts has a minimum distance two (i.e., $d_{min}$=2). The minimum distance determines the error correction capability of a code. A code with a $d_{min}$ of two has some ability to correct for errors using a soft-decision decoder. The paging message recovered in step 614 is then checked using the parity bits to determine whether the message has been decoded correctly or in error (step 616). If the recovered paging message is good, then it is provided (step 640) and the process proceeds to step 650.

Otherwise, if it is determined in step 616 that the recovered paging message is not decoded correctly, then the third burst (i.e., burst 2 in FIG. 5) for the paging message is received by the terminal (step 622). The three received bursts are then decoded to recover the paging message (step 624). For early decoding with only the first three bursts, erasures are substituted for the missing bits in the last burst. The resulting code with only the first three bursts is effectively a rate ¾, constraint length 5 code. This code has improved error correction capability over the code corresponding to the first two bursts. The paging message recovered in step 624 is then checked to determine whether it is decoded correctly or in error (step 626). If the recovered paging message is good, then it is provided (step 640) and the process proceeds to step 650.

Otherwise, if it is determined in step 626 that the recovered paging message is not decoded correctly, then the fourth and final burst (i.e., burst 3 in FIG. 5) for the paging message is received by the terminal (step 632). All four received bursts are then decoded to recover the paging message (step 634). The recovered paging message is then checked to determine whether it is decoded correctly or in error (step 636). The recovered paging message is provided if it is good (step 640). Otherwise, an error indication is provided (step 642). In either case, the process proceeds to step 650.

In step 650, the decoding of the message terminates and the terminal may go to sleep. The terminal goes to sleep and powers down early if the paging message is recovered based on only the first two or three bursts and if no other actions are required. In particular, if the paging message is recovered based on only the first two bursts (i.e., the answer for step 616 is 'yes'), then it is not necessary to receive the remaining two bursts and the terminal may go to sleep two TDMA frames early. The awake time is then 9 time slots to receive the first two bursts plus warm-up time and decoding time. Conventionally, the awake time is 25 time slots to receive all four bursts plus warm-up time and decoding time. The early decoding with only two bursts can provide a reduction in the awake time by approximately 50% for an exemplary terminal design. This shortened awake time translates to an improvement in standby time of 20 to 40 percent for the exemplary terminal design, which is highly desirable.

Similarly, if the paging message is recovered based on only the first three bursts (i.e., the answer for step 626 is 'yes'), then it is not necessary to receive the last burst and the terminal may go to sleep one TDMA frame early. The awake time is then 17 time slots to receive the first three bursts (instead of 25 time slots to receive all four bursts) plus warm-up time and decoding time. The early decoding with three bursts can provide a reduction in the awake time by approximately 25% for the exemplary terminal design, which is also desirable.

Figure 7:
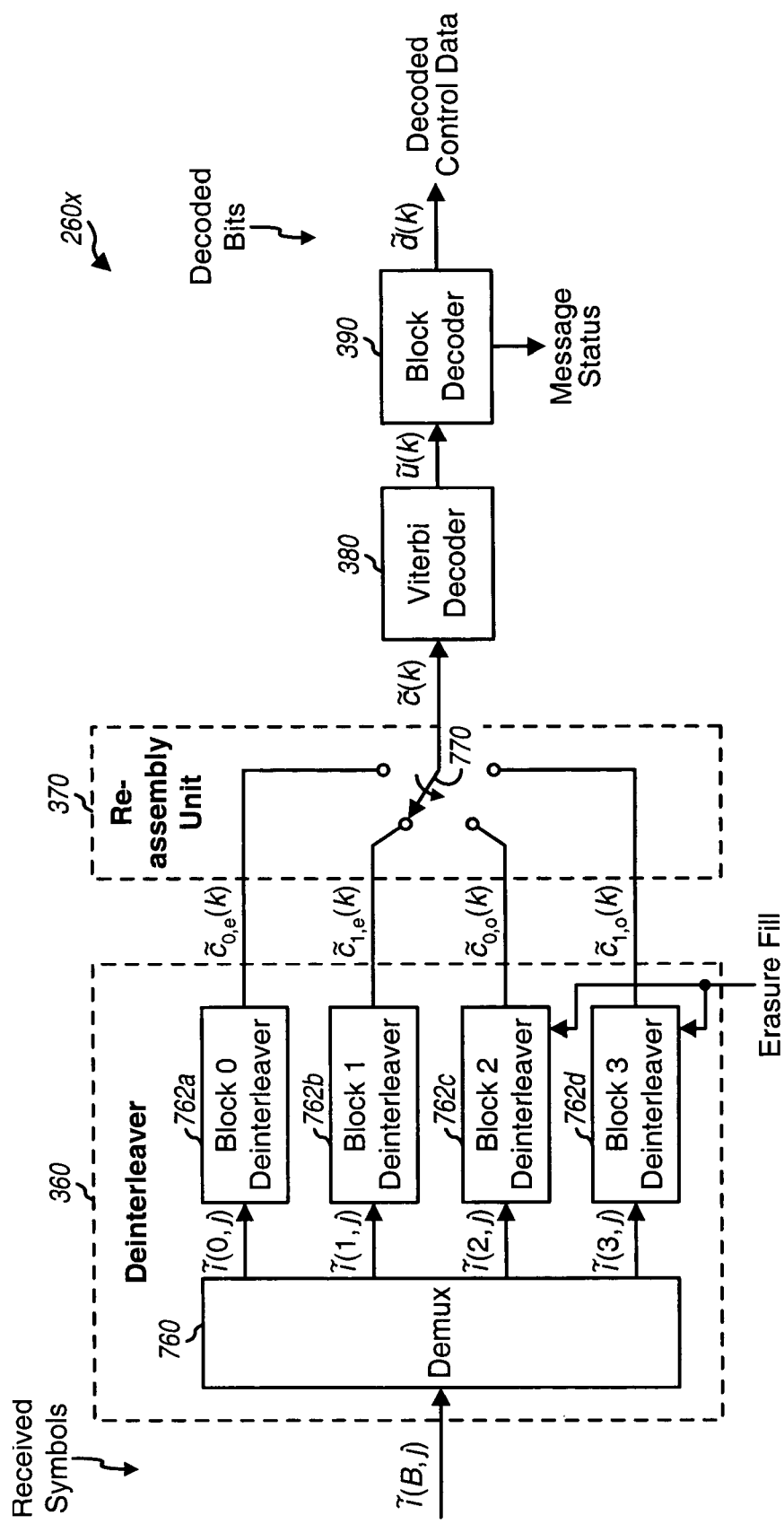
FIG. 7 shows a block diagram of the units within the RX data processor.

FIG. 7 shows a block diagram of the units within RX data processor 260x. For this embodiment, deinterleaver 360 includes a demultiplexer 760 and four block deinterleavers 762a through 762d for the four output blocks 0 through 3, respectively, of a paging message.

Within deinterleaver 360, block deinterleavers 762c and 762d for output blocks 2 and 3 are initially filled with erasures prior to receiving the first burst for a paging message to be recovered. The erasure fill is performed based on an Erasure Fill control signal provided by controller 270. Demultiplexer 760 obtains the received symbols for the paging message, provides the received symbols for burst 0 to block deinterleaver 762a, and provides the received symbols for burst 1 to block deinterleaver 762b. If more than two bursts are received, demultiplexer 760 provides the received symbols for burst 2 to block deinterleaver 762c and the received symbols for burst 3 to block deinterleaver 762d. Each of block deinterleavers 762a through 762d deinterleaves its 114 received symbols in a complementary manner to the interleaving performed at base station 110x. Within reassembly unit 370, a 4×1 switch 770 receives the outputs from block deinterleavers 762a through 762d at its four inputs. Switch 770 cycles through all four deinterleavers 762a through 762d and provides a block of received symbols to Viterbi decoder 380 for each decoding attempt to recover the paging message. The specific interleaving scheme used by GSM allows the deinterleaving and re-assembly to be depicted as shown in FIG. 7. The more general representation would be: re-assembly, then deinterleaving, then decoding.

Early decoding may be performed after the second burst has been received. In this case, a block of received symbols obtained with only the first two bursts is provided by reassembly unit 370, convolutionally decoded by Viterbi decoder 380, and further checked by block decoder 390 to obtain the status of the paging message (good or bad). If the message status indicates an erasure, then early decoding may be performed again after the third burst has been received. In this case, a block of received symbols obtained with only the first three bursts is provided by reassembly unit 370, convolutionally decoded by Viterbi decoder 380, and further checked by block decoder 390 to obtain the message status. If the message status again indicates an erasure, then decoding may be performed again after the fourth and final burst has been received. In this case, a block of received symbols obtained with all four bursts is provided by reassembly unit 370, convolutionally decoded by Viterbi decoder 380, and further checked by block decoder 390.

Figure 8A:
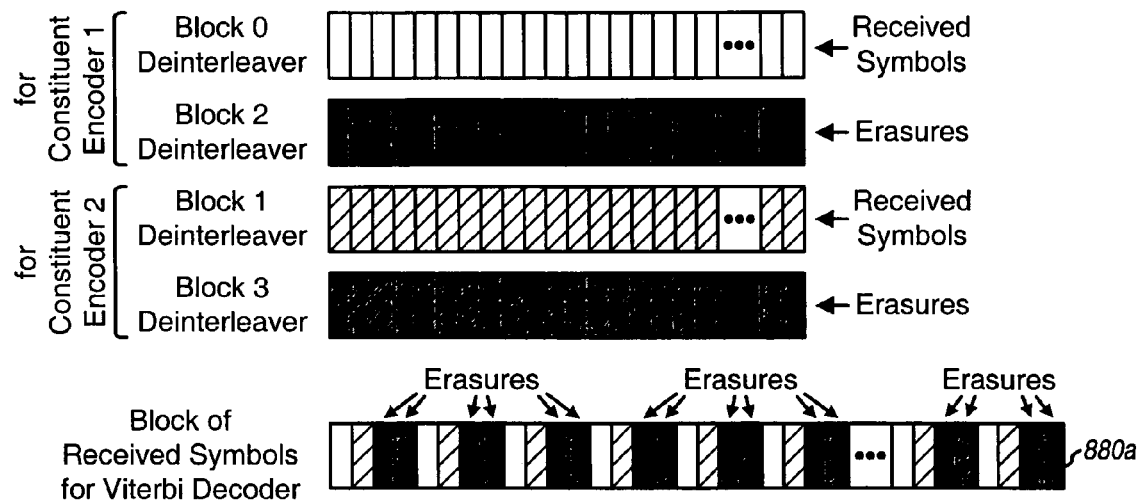
FIGS. 8A and 8B illustrate the contents of the block deinterleavers within the RX data processor after receiving two and three bursts, respectively.

FIG. 8A illustrates the contents of block deinterleavers 762a through 762d and the input to Viterbi decoder 380 for early decoding after receiving the first two bursts. For this case, block deinterleaver 762a is filled with even-indexed received symbols $\tilde{c}_{0,e}(k)$ for first constituent encoder 420a, block deinterleaver 762b is filled with even-indexed received symbols $c_{1,e}(k)$ for second constituent encoder 420b, and block deinterleavers 762c and 762d contain erasures. A block 880a of received symbols provided to Viterbi decoder 380 contains one-half received symbols and one-half erasures having a puncturing pattern of (0011), where a "0" indicates a transmitted coded bit and a "1" indicates a punctured coded bit.

Figure 8B:
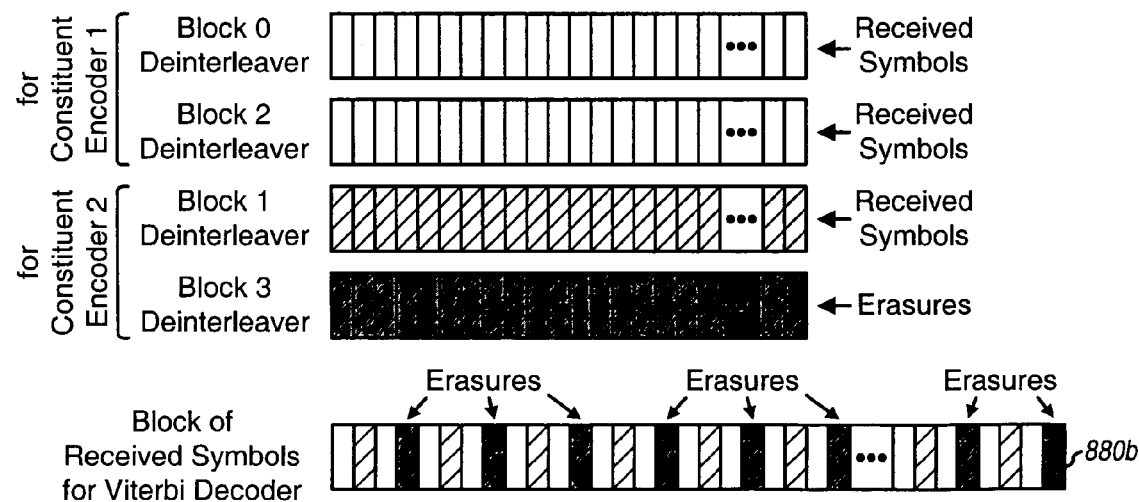

FIG. 8B illustrates the contents of block deinterleavers 762a through 762d and the input to Viterbi decoder 380 for early decoding after receiving the first three bursts. For this case, block deinterleavers 762a and 762b are filled as described above, block deinterleaver 762c is filled with odd-indexed received symbols $\tilde{c}_{0,o}(k)$ for first constituent encoder 420a, and deinterleaver 762d contains erasures. A block 880b of received symbols provided to Viterbi decoder 380 contains three-quarter received symbols and one-quarter erasures having a puncturing pattern of (0001).

For GSM, a 40-bit FIRE code is used to generate the 40 parity bits for each paging message. The parity bits for each received paging message are used for error detection to determine whether the message is decoded correctly or in error. It is extremely unlikely for the parity bits to indicate a good paging message when such is not the case. The parity bits for each received paging message may also be used for error correction. The 40-bit FIRE code can correct error bursts of 12 bits or less. Thus, if a paging message is determined to be decoded in error, then the parity bits may be used to correct for errors in the message. After the error correction, the message may be checked again to determine whether it is good or bad.

The techniques described herein may be used for early decoding of various control channels in various wireless communication systems. In general, early decoding of a message may be performed if supported by the coding and interleaving schemes used for the message. Moreover, early decoding may be attempted based on the likelihood of success. Early decoding is suitable for a control channel since control data is typically encoded and transmitted such that it can be successfully received and decoded even by a terminal experiencing the expected worst-case channel condition. Typically, many terminals experience much better channel conditions than the worst-case terminal. These terminals may receive the control data with higher signal-to-noise ratios (SNRs) and may be able to successfully perform early decoding of the control data.

Figure 9:
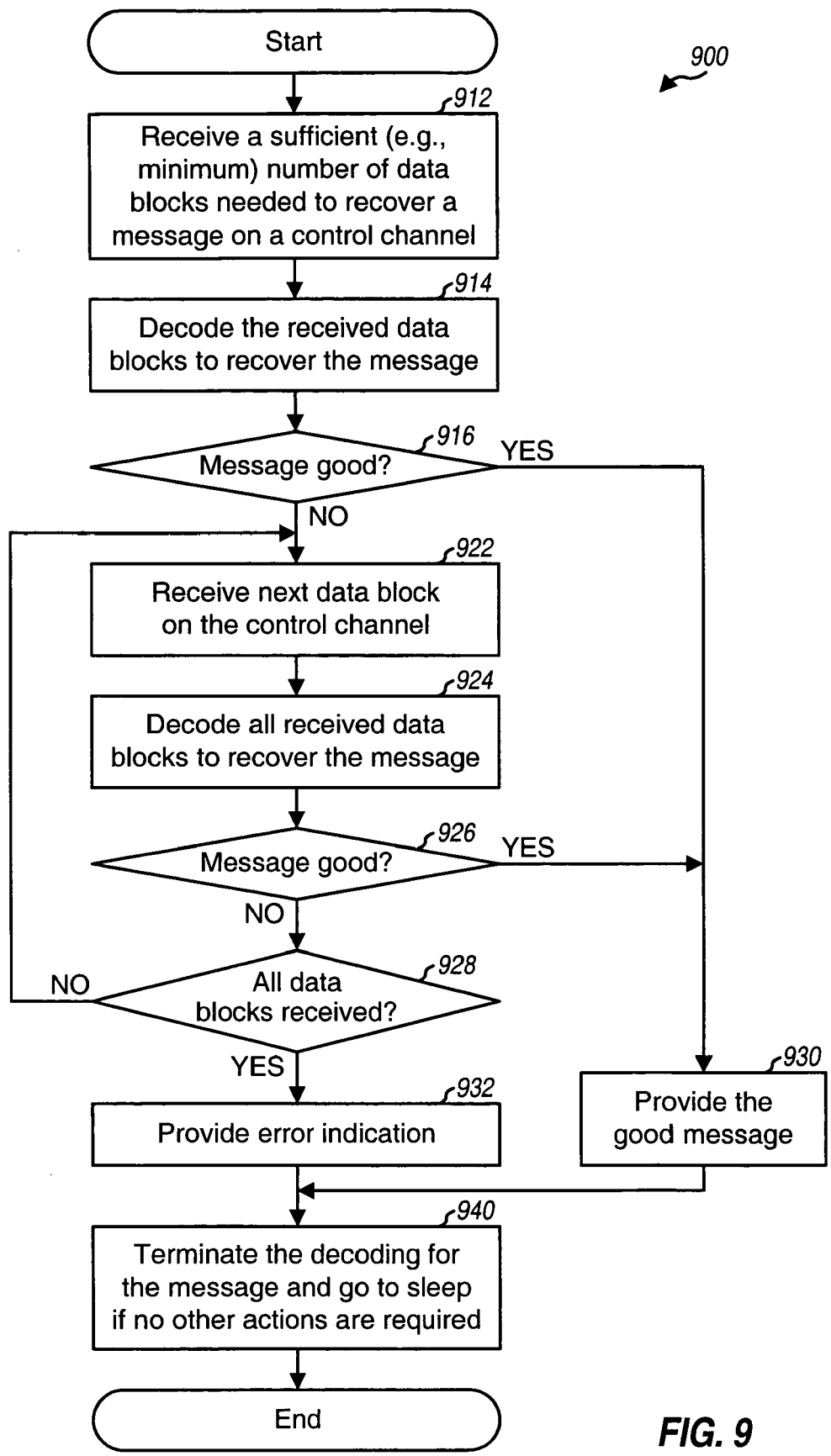
FIG. 9 shows a process for performing early decoding for a control channel in a wireless communication system.

FIG. 9 shows a flow diagram of a process 900 for performing early decoding for a control channel (e.g., a paging channel) in a wireless communication system (e.g., a GSM system or a CDMA system). In the following description, it is assumed that a message is encoded and partitioned into multiple ($N_{total}$) data blocks, which are transmitted at different times.

Initially, a sufficient number of data blocks (i.e., $N_{init}$ data blocks) needed to recover a message on the control channel is received (step 912). The minimum number of data blocks (i.e., $N_{min}$ data blocks) required to recover the message is determined by the specific coding and interleaving schemes used for the message. For example, $N_{min}=2$ for a message sent on the paging channel or the broadcast control channel in GSM. In general, $N_{init}$ is less than $N_{total}$ and is equal to or greater than $N_{min}$ (i.e., $N_{total} > N_{init} \geq N_{min}$ and $4 > N_{init} \geq 2$ for GSM).

The $N_{init}$ received data blocks are decoded to recover the message (step 914). The recovered message is then checked based on an error detection value (e.g., a cyclic redundancy check (CRC) value) included in the message to determine whether the message has been decoded correctly or in error (step 916). If the recovered message is good, then it is provided (step 930) and the process proceeds to step 940.

Otherwise, if it is determined in step 916 that the recovered message is not decoded correctly, then the next data block for the message is received (step 922). All of the received data blocks are then decoded to recover the message (step 924). The recovered message is then checked to determine whether it is decoded correctly or in error (step 926). If the recovered message is good, then it is provided (step 930) and the process proceeds to step 940. Otherwise, a determination is made whether or not all $N_{total}$ data blocks for the message have been received (step 928). If the answer is 'no', then the process returns to step 922 to receive the next data block. Otherwise, an error indication is provided (step 932) and the process proceeds to step 940.

In step 940, the decoding of the message terminates and the terminal may go to sleep. The terminal may go to sleep early if the message is recovered with fewer than $N_{total}$ data blocks and if no other actions are required.

GSM requires a terminal in idle mode to continue monitoring all BCCH carriers or frequencies that are indicated in its BCCH allocation. This monitoring requirement is described in 3GPP TS 05.08, Section 6.6.1, which is publicly available. To satisfy this monitoring requirement, seven power measurements are normally obtained for seven other carriers by an idle mode terminal in each paging block. A paging block refers to the four TDMA frames for a message sent on the paging channel. For a conventional terminal designed to decode a paging message only after receiving all four bursts, the monitoring may be performed with a 2-2-2-1 pattern. This pattern indicates that two power measurements are made in the first TDMA frame, two power measurements are made in the second TDMA frame, two power measurements are made in the third TDMA frame, and one power measurement is made in the fourth TDMA frame.

For a terminal designed to perform early decoding, the monitoring may be performed with a 4-3 pattern. This pattern indicates that four power measurements are made in the first TDMA frame and three power measurements are made in the second TDMA frame. The seven power measurements may also be made in some other manner (e.g., using other patterns) such that the awake time is not extended due to these measurements. For one exemplary terminal design, the amount of time needed to tune the frequency and receive a burst on the paging channel is two time slots, and a power measurement can be made in less than half a time slot. For this exemplary terminal design, four power measurements can easily be made in the six remaining time slots in each TDMA frame.

The early decoding techniques described herein may be implemented by various means. For example, these techniques may be implemented in hardware, software, or a combination thereof. For a hardware implementation, the processing units used to perform early decoding (e.g., RX data processor 260 and controller 270) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the early decoding techniques may be implemented with modules (e.g., procedures, functions, and so on) that perform the functions described herein. The software codes may be stored in a memory unit (e.g., memory unit 272 in FIG. 2) and executed by a processor (e.g., controller 270). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device in a wireless communication system, comprising:
   a buffer operative to receive a sufficient number of data blocks needed to recover a message sent on a control channel, wherein the sufficient number of data blocks is less than a total number of data blocks generated and transmitted for the message;
   a decoder operative to decode the received data blocks to recover the message; and
   a controller operative to terminate the decoding for the message, without receiving all of the total number of data blocks, if the message is decoded correctly.

2. The device of claim 1, wherein if the message is decoded in error,
   the buffer is operative to receive a next data block for the message, and
   the decoder is operative to decode all of the received data blocks to recover the message.

3. The device of claim 1, wherein until the message is decoded correctly or all of the total number of data blocks have been received and decoded,
   the buffer is operative to receive a next data block for the message, and
   the decoder is operative to decode all of the received data blocks to recover the message.

4. The device of claim 3, wherein the buffer is operative to provide a block of erasures for each data block not received among the total number of data blocks, and wherein the decoder is operative to decode the received data blocks and blocks of erasures for data blocks not received.

5. The device of claim 1, wherein the sufficient number of data blocks is equal to a minimum number of data blocks required to decode the message.

6. The device of claim 1, wherein the controller is further operative to initiate a transition to a sleep state after the message has been decoded correctly.

7. The device of claim 1, wherein the control channel is a paging channel.

8. The device of claim 1, wherein the control channel is a broadcast control channel.

9. The device of claim 1, wherein the wireless communication system is a Global System for Mobile Communications (GSM) communication system.

10. The device of claim 1, wherein the wireless communication system is a Code Division Multiple Access (CDMA) communication system.

11. A device in a Global System for Mobile Communications (GSM) communication system, comprising:
    a buffer operative to receive first and second bursts of data for a message sent on a control channel, wherein four bursts of data are transmitted for the message;
    a decoder operative to decode the first and second bursts of data to recover the message; and
    a controller operative to terminate the decoding for the message, without receiving all four bursts of data, if the message is decoded correctly.

12. The device of claim 11, wherein if the message is decoded in error with the first and second bursts of data,
the buffer is operative to receive a third burst of data for the message, and
the decoder is operative to decode the first, second, and third bursts of data to recover the message.

13. The device of claim 12, wherein if the message is decoded in error with the first, second, and third bursts of data,
the buffer is operative to receive a fourth burst of data for the message, and
the decoder is operative to decode the first, second, third, and fourth bursts of data to recover the message.

14. The device of claim 11, wherein the controller is further operative to initiate a transition to a sleep state after the message has been decoded correctly.

15. The device of claim 11, wherein the buffer is operative to provide a burst of erasures for each burst of data not received among the four bursts of data, and wherein the decoder is operative to decode received bursts of data and bursts of erasures for bursts of data not received.

16. The device of claim 11, wherein the control channel is a paging channel (PCH) in GSM.

17. The device of claim 11, wherein the control channel is a broadcast control channel (BCCH) in GSM.

* * * * *